C. SCHWAGER & J. WISSEN.
Propeller for Sleds.

No. 164,221. Patented June 8, 1875.

UNITED STATES PATENT OFFICE.

CHARLES SCHWAGER AND JOSEPH WISSEN, OF INDIANAPOLIS, INDIANA.

IMPROVEMENT IN PROPELLERS FOR SLEDS.

Specification forming part of Letters Patent No. 164,221, dated June 8, 1875; application filed April 10, 1875.

*To all whom it may concern:*

Be it known that we, CHARLES SCHWAGER and JOSEPH WISSEN, of Indianapolis, in the county of Marion and State of Indiana, have invented a Combined Brake and Propelling Attachment to Sleds, of which the following is a specification:

Our invention consists in a pair of slotted levers working on a fulcrum-pin projecting from a vertical plate, adjustably attached to each side of a sled, and actuated by a cranked shaft journaled across the sled in the tops of the said plates, by means of which the rider can, by turning the crank-shaft, propel the sled, and, when necessary, use the levers as brakes to arrest the motion, or retard it on a gradient, as more fully hereinafter set forth.

Figure 1:
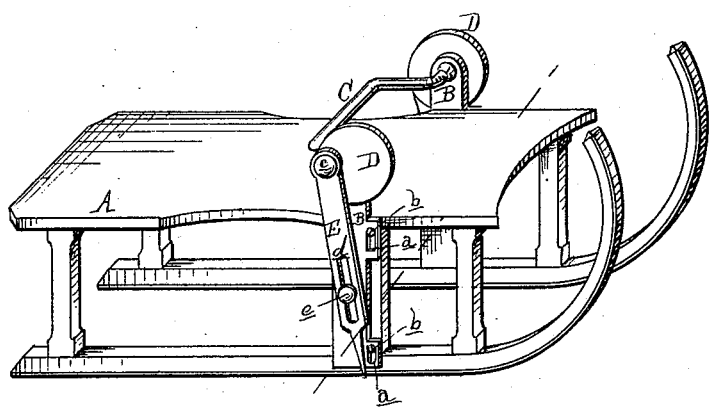
Figure 2:
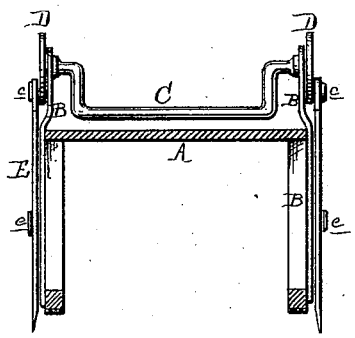

Figure 1 is a perspective view of a sled fitted with our attachment. Fig. 2 is a cross-section at $x\ x$.

In the drawing, A represents a sled, to each side of which is adjustably secured a standard-plate, B, extending from the runner to and above the top or seat, by two bolts, $b$, passing through slots $a$. C is a cranked shaft journaled across the tops of the plates B, carrying a face-plate, D, on each end. E is a lever, having a pointed lower end. The upper end has an eye, through which passes a wrist-pin, $c$, on the face-plate. Below the middle there is a longitudinal slot, $d$, in each lever, through which passes a fulcrum-stud, $e$, projecting from the plate B, which plates may be adjusted so as to bring the pointed ends of the levers below the plane of the runners at each revolution of the shaft, giving said pointed levers a kind of a walking motion to propel the sled. They may also be used as brakes to check the speed of the sled.

We are aware that sled-brakes have been made, consisting of forked levers pivoted near their lower ends to the runners, and each provided with a slotted arm that engages with the arm of a rock-shaft secured to brackets on the under side of the sled, the said rock-shaft being provided with a lever-arm, by which, through the rocker-arms, the forked levers are forced against the ground, and act as a brake to the sled, and we do hereby disclaim such a brake as making any part of our invention.

What we claim as our invention is—

The plates B B, cranked shaft C, face-plates D, wrist-pins $c$, pointed levers E E, and fulcrum-studs $e$, in combination with a sled, substantially as and for the purpose specified.

CHARLES SCHWAGER.
JOSEPH WISSEN.

Witnesses:
JAMES N. SWEETSER,
WILLIAM H. BLAIR.